US006664683B1

(12) United States Patent
Yashiro et al.

(10) Patent No.: US 6,664,683 B1
(45) Date of Patent: Dec. 16, 2003

(54) MOTOR AND TURBO-MOLECULAR PUMP

(75) Inventors: Hirokazu Yashiro, Gifu-ken (JP); Youichi Kuwayama, Gifu-ken (JP)

(73) Assignee: Ibiden Co., LTD, Gifu-ken (JP)

( * ) Notice: Subject to any disclaimer, the term of this patent is extended or adjusted under 35 U.S.C. 154(b) by 0 days.

(21) Appl. No.: 09/493,983

(22) Filed: Jan. 28, 2000

(30) Foreign Application Priority Data

Jan. 29, 1999 (JP) .......................................... 11-022012
Feb. 5, 1999 (JP) .......................................... 11-028383

(51) Int. Cl.[7] .............................. H02K 5/16; F04D 19/04
(52) U.S. Cl. ................... 310/90; 310/67 R; 417/423.4; 417/423.12; 384/112
(58) Field of Search ........................ 310/261, 52, 61, 310/90.5, 90, 67 R; 415/107, 115; 417/414, 365, 423.4, 423.12, 423.1, 423.2; 384/112

(56) References Cited

U.S. PATENT DOCUMENTS

| 2,545,335 | A | * | 3/1951 | Becker | 310/52 |
| 3,969,042 | A | | 7/1976 | Bächler | |
| 4,284,917 | A | * | 8/1981 | Yassemi | 310/89 |
| 4,759,644 | A | | 7/1988 | Mizukusa et al. | |
| 4,896,975 | A | | 1/1990 | Bescoby et al. | |
| 5,019,738 | A | * | 5/1991 | Weilbach et al. | 310/90.5 |
| 5,089,732 | A | * | 2/1992 | Konno et al. | 310/67 R |
| 5,142,173 | A | * | 8/1992 | Konno et al. | 310/67 R |
| 5,357,162 | A | * | 10/1994 | Aiyoshizawa et al. | 310/90 |
| 5,471,104 | A | * | 11/1995 | Toshimitsu et al. | 310/90 |
| 5,650,674 | A | * | 7/1997 | Hayashi | 310/51 |
| 5,707,213 | A | * | 1/1998 | Conrad | 415/177 |

FOREIGN PATENT DOCUMENTS

| DE | 41 11 466 A1 | 10/1992 | |
| DE | 42 14 877 A1 | 11/1993 | |
| JP | 63-14894 | 1/1988 | |
| JP | 2-016389 | * 1/1990 | ........... F04D/19/04 |

* cited by examiner

Primary Examiner—Burton Mullins
(74) Attorney, Agent, or Firm—Crompton, Seager & Tufte, LLC

(57) ABSTRACT

A compact turbo-molecular pump having a high depressurizing capability. A motor for rotating a rotor vane includes an air bearing. The air bearing has a rotary cylinder and a fixed surface surrounding the rotary cylinder. The material of the rotary cylinder has a coefficient of thermal expansion that is smaller than that of the material of the fixed surface. Thus, change in the dimensions of the rotary cylinder is smaller than that of the fixed surface even if the temperature of the air bearing rises during operation of the pump. Thus, the rotary cylinder avoids contact with the fixed surface.

20 Claims, 6 Drawing Sheets

Upper side
Lower side

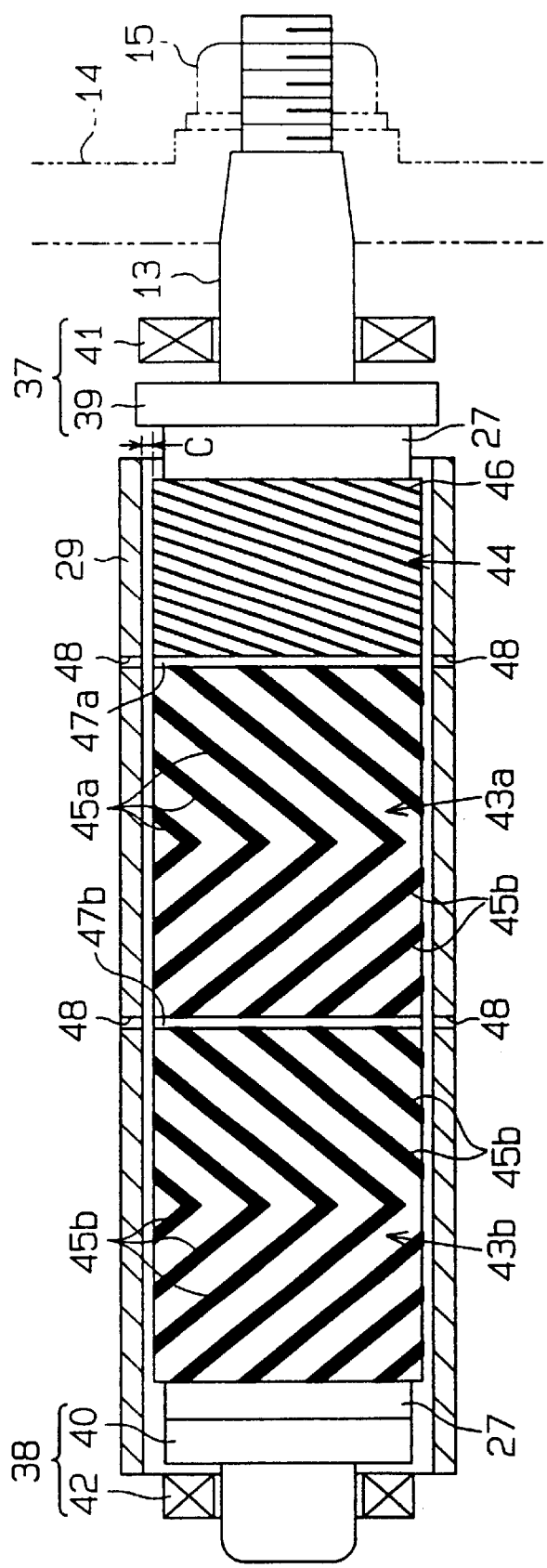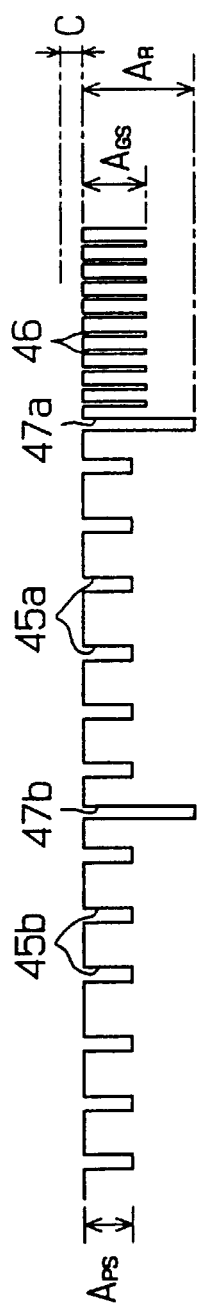

MOTOR AND TURBO-MOLECULAR PUMP

BACKGROUND OF THE INVENTION

The present invention relates to a motor and a turbo-molecular pump.

A turbo-molecular pump produces an ultra-high vacuum state and is employed in, for example, semiconductor fabrication related apparatuses (e.g., sputtering apparatuses, chemical vapor deposition (CVD) apparatuses, and etching apparatuses) and measuring apparatuses (e.g., electron microscopes, surface analysis apparatuses, and environment testing apparatuses). A typical turbo-molecular pump includes a motor and a plurality of rotor vanes rotated by the motor. The rotor vanes are rotated to produce a molecular flow and discharge gases. This causes an ultrahigh vacuum state in the interior of the apparatus connected to the turbo-molecular pump.

The motor has a rotary shaft that is rotated at a high speed to produce the ultra-high vacuum state. The bearing that supports the rotary shaft must thus be capable of high speed rotation. A ball bearing, which requires lubricating oil, is not appropriate for such application. This is because the vapor pressure of the lubricating oil, although low, hinders depressurization to the ultra-vacuum state by the turbo-molecular pump. Further, vaporized lubricating oil contaminates vacuum chambers.

Japanese Unexamined Utility Model Publication No. 63-14894 and Japanese Unexamined Patent Publication No. 2-16389 describes a turbo-molecular pump that does not use lubricating oil. This turbo-molecular pump employs non-contact bearings, such as air bearings or magnetic bearings.

A kinetic air bearing is one example of an air bearing. This air bearing has a fixed cylinder and a rotatable cylinder, which is arranged in the fixed cylinder. A bearing area and a seal area are defined on the outer surface of the rotatable cylinder. A plurality of dynamic pressure grooves extend along the bearing area. A predetermined clearance is provided between the outer surface of the rotatable cylinder and the inner surface of the fixed cylinder.

One end of the two cylinders is exposed to a predetermined vacuum atmosphere. Thus, the seal area is located near that end of the rotatable cylinder to prevent gases from moving between a compressed gas layer in the bearing and the vacuum atmosphere. A plurality of helical seal grooves extend along the seal area. An annular groove formed on the outer surface of the rotatable cylinder extends along a boundary area defined between the bearing area and the seal area. An aperture extends through the fixed cylinder at a location opposed to the annular groove. The motor drives and rotates the rotatable cylinder. The rotation causes the air outside the fixed cylinder to pass through the aperture and into the clearance (especially to the region between the bearing area and the opposed area of the fixed cylinder). This forms a pressure gas film, or the compressed gas layer, which radially supports the rotary shaft.

When the rotating speed of the rotatable cylinder is lower than a predetermined value, the rotatable cylinder slides on the fixed cylinder. Ceramics having relatively high anti-wear properties, such as alumina and zirconia, may be used as the material of the fixed and rotatable cylinders.

When designing the turbo-molecular pump, the depressurizing capability of the motor determines the number of vanes and the motor speed. For example, the motor speed is 50,000 rpm to 70,000 rpm in a typical, compact turbo-molecular pump.

The viscous friction produced by air increases the temperature of the air bearing during high speed rotation. The generated heat is transferred rather easily from the outer surface of the fixed cylinder. On the other hand, since the rotatable cylinder is covered by the fixed cylinder, heat cannot be transferred from the rotatable cylinder so easily. This results in a large difference between the temperature of the fixed cylinder and the temperature of the rotatable cylinder. The coefficient of thermal expansion for ceramics, such as alumina and zirconia, is 7 to $8 \times 10^{-6}/°$ C. and thus relatively high. Therefore, in an air bearing made of alumina or zirconia, the temperature difference between the fixed cylinder and the rotatable cylinder causes the dimension change of the fixed cylinder to differ from that of the rotatable cylinder. This varies the size of the clearance. Consequently, the rotatable cylinder may contact the fixed cylinder and obstruct high speed rotation.

A fan is often used to cool the air bearing. The fan is effective for cooling the outer part of the air bearing, or the fixed cylinder, but not for cooling the inner part, or the rotatable cylinder. Hence, the fan further increases the temperature difference between the rotatable cylinder and the fixed cylinder and changes the size of the clearance. There is a demand for a more compact turbo-molecular pump that operates at higher rotating speeds. In such a pump, the size of the clearance must be decreased. Therefore, the effects of heat on the air bearing cannot be ignored.

To increase the speed of the motor, a bearing that has an improved seal and improved performance is necessary. The vibrations of the rotatable cylinder affect the supporting characteristics of the rotatable cylinder. For example, the depth of the dynamic pressure grooves affect the natural frequency of the rotatable cylinder. When the natural frequency (Hz) of the rotatable cylinder and the rotating speed (rps) of the rotatable cylinder are about the same, the possibility of resonance is high. Resonance causes vibrations of the motor. Therefore, the depth of the dynamic pressure grooves is an important factor for obtaining improved bearing characteristics. Further, the depth of the seal grooves affects the seal characteristics. Hence, the depth of the seal grooves is an important factor for obtaining a high degree of vacuum.

SUMMARY OF THE INVENTION

It is an object of the present invention to provide a compact motor applicable to high speeds and a compact turbo-molecular pump having a high depressurizing capability.

To achieve the above object, the present invention provides a motor including a rotary shaft and a bearing for radially supporting the rotary shaft. The bearing includes a cylindrical rotary member connected to the rotary shaft, and a cylindrical fixed surface surrounding the rotary member. The fixed surface is spaced from the rotary member by a predetermined distance. The material of the rotary member has a coefficient of thermal expansion that is smaller than that of the material of the fixed surface.

Another aspect of the present invention provides a motor including a rotary shaft and a bearing for radially supporting the rotary shaft, wherein the bearing includes a cylindrical rotary member connected to the rotary shaft and a cylindrical fixed surface surrounding the rotary member. The fixed surface is spaced from the rotary member by a predetermined distance. The rotary member is made of a material having a coefficient of thermal expansion that is $5 \times 10^{-6}/°$ C. or less.

A further aspect of the present invention provides a turbo-molecular pump including a housing, a stator vane attached to the housing, a rotor vane rotated relative to the stator vane, and a motor for driving the rotor vane. The motor includes a rotary shaft and a bearing for radially supporting the rotary shaft. The bearing includes a cylindrical rotary member connected to the rotary shaft and a cylindrical fixed surface surrounding the rotary member. The fixed surface is spaced from the rotary member by a predetermined distance. The material of the rotary member has a coefficient of thermal expansion that is smaller than that of the material of the fixed surface.

A further aspect of the present invention provides a turbo-molecular pump including a housing, a stator vane attached to the housing, a rotor vane rotated relative to the stator vane, and a motor for driving the rotor vane. The motor includes a rotary shaft and a bearing for radially supporting the rotary shaft. The bearing includes a cylindrical rotary member connected to the rotary shaft and a cylindrical fixed surface surrounding the rotary member. The fixed surface is spaced from the rotary member by a predetermined distance. The rotary member is made of a material having a coefficient of thermal expansion that is $5 \times 10^{-6}/°$ C. or less.

A further aspect of the present invention provides a motor including a rotary shaft and a bearing for radially supporting the rotary shaft. The bearing includes a cylindrical rotary member connected to the rotary shaft and a cylindrical fixed surface surrounding the rotary member. The fixed surface is spaced from the rotary member by a predetermined distance. At least one of the rotary member and the fixed surface has a dynamic pressure groove formed on a predetermined first area defined on a surface opposing the other of the rotary member and the fixed surface. At least one of the rotary member and the fixed surface has a seal groove formed on a predetermined second area defined on a surface opposing the other one of the rotary member and the fixed surface. The seal groove is formed deeper than the dynamic pressure groove.

A further aspect of the present invention provides a turbo-molecular pump including a housing, a stator vane attached to the housing, a rotor vane rotated relative to the stator vane, and a motor for driving the rotor vane. The motor includes a rotary shaft and a bearing for radially supporting the rotary shaft. The bearing includes a cylindrical rotary member connected to the rotary shaft and a cylindrical fixed surface surrounding the rotary member. The fixed surface is spaced from the rotary member by a predetermined distance. At least one of the rotary member and the fixed surface has a dynamic pressure groove defined on a surface opposing the other of the rotary member and the fixed surface. At least one of the rotary member and the fixed surface has a first seal groove formed on a surface opposing the other of the rotary member and the fixed surface. The first seal groove is formed deeper than the dynamic pressure groove.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6A is a side view, partly in cross-section, showing an air bearing of a turbo-molecular pump according to a third embodiment of the present invention;

FIG. 6B is a diagram showing the depths of the grooves formed in the rotary cylinder of FIG. 6A;

DETAILED DESCRIPTION OF THE PREFERRED EMBODIMENTS

A turbo-molecular pump 1 according to a first embodiment of the present invention will now be described with reference to FIGS. 1 to 4.

Figure 1:
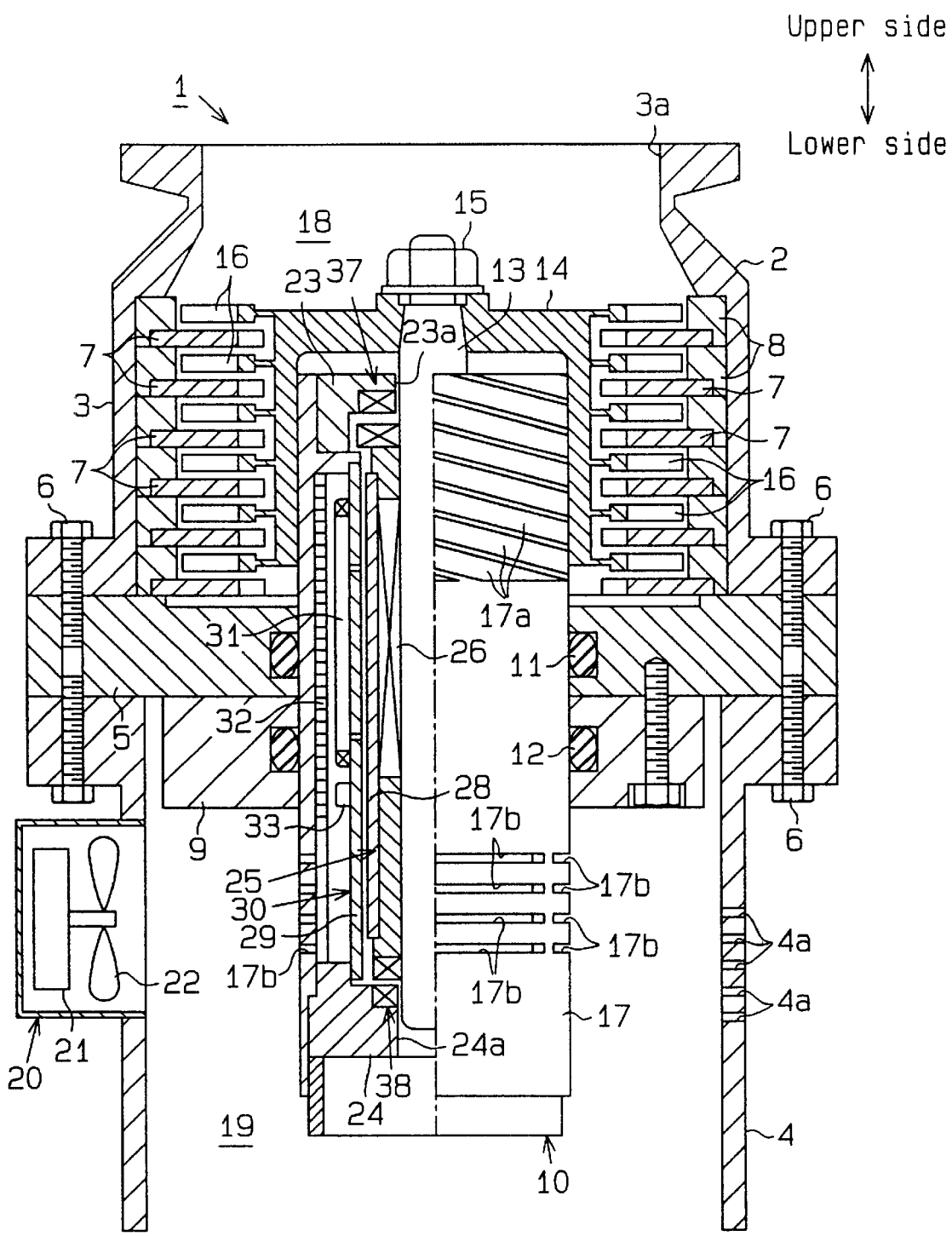
FIG. 1 is a cross-sectional view showing a turbo-molecular pump according to a first embodiment of the present invention.

As shown in FIG. 1, the turbo-molecular pump 1 has a housing 2 and a brushless motor 10. The housing 2 includes an upper housing 3, a lower housing 4, and an annular support block 5. The support block 5 is held between the upper and lower housings 3, 4. The upper housing 3, the support block 5, and the lower housing 4 are fastened together by a plurality of bolts 6.

An intake 3a, which is connected to a vacuum chamber (not shown), extends through the top end of the upper housing 3. Gas in the vacuum chamber is drawn into the motor 10 through the intake 3a. A plurality of supports 8 are attached to the inner wall of the upper housing 3. The supports 8 support a plurality of stator vanes 7, each of which extends inwardly from the upper housing 3. An annular support adapter 9 is fixed to the lower surface of the support block 5.

O-rings 11, 12 are fitted in the inner surfaces of the support block 5 and the support adapter 9, respectively. The motor 10 is supported by the support block 5 and the support adapter 9. The O-rings 11, 12 seal the space between the motor 10, the support block 5, and the support adapter 9. An intake region 18 is defined above the support block 5. A discharge region 19 is defined below the support block 5 and the support adapter 9.

The motor 10 has a rotary shaft 13, the upper end of which extends into the intake 3a. A cup-like wheel 14 is fastened to the upper end of the rotary shaft 13 by a nut 15. A plurality of rotor vanes 16 extend from the peripheral surface of the wheel 14. The rotor vanes 16 are each arranged in a gap formed between an associated pair of stator vanes 7. The motor 10 includes a motor case 17, which is spaced slightly from the inner cylindrical surface of the wheel 14.

An outer helical groove 17a extends along the outer surface of the motor case 17 and is opposed to the inner surface of the wheel 14. A plurality of air cooling slits 17b extend through part of the outer surface of the motor case 17 in the discharge region 19.

An air cooling fan unit 20 is attached to the lower housing 4. The fan unit 20 has a motor 21 and a fan 22, which is connected to the motor 21. The fan unit 20 produces an air current directed toward the slits 17b.

The structure of the brushless motor 10 will now be described.

Figure 2:
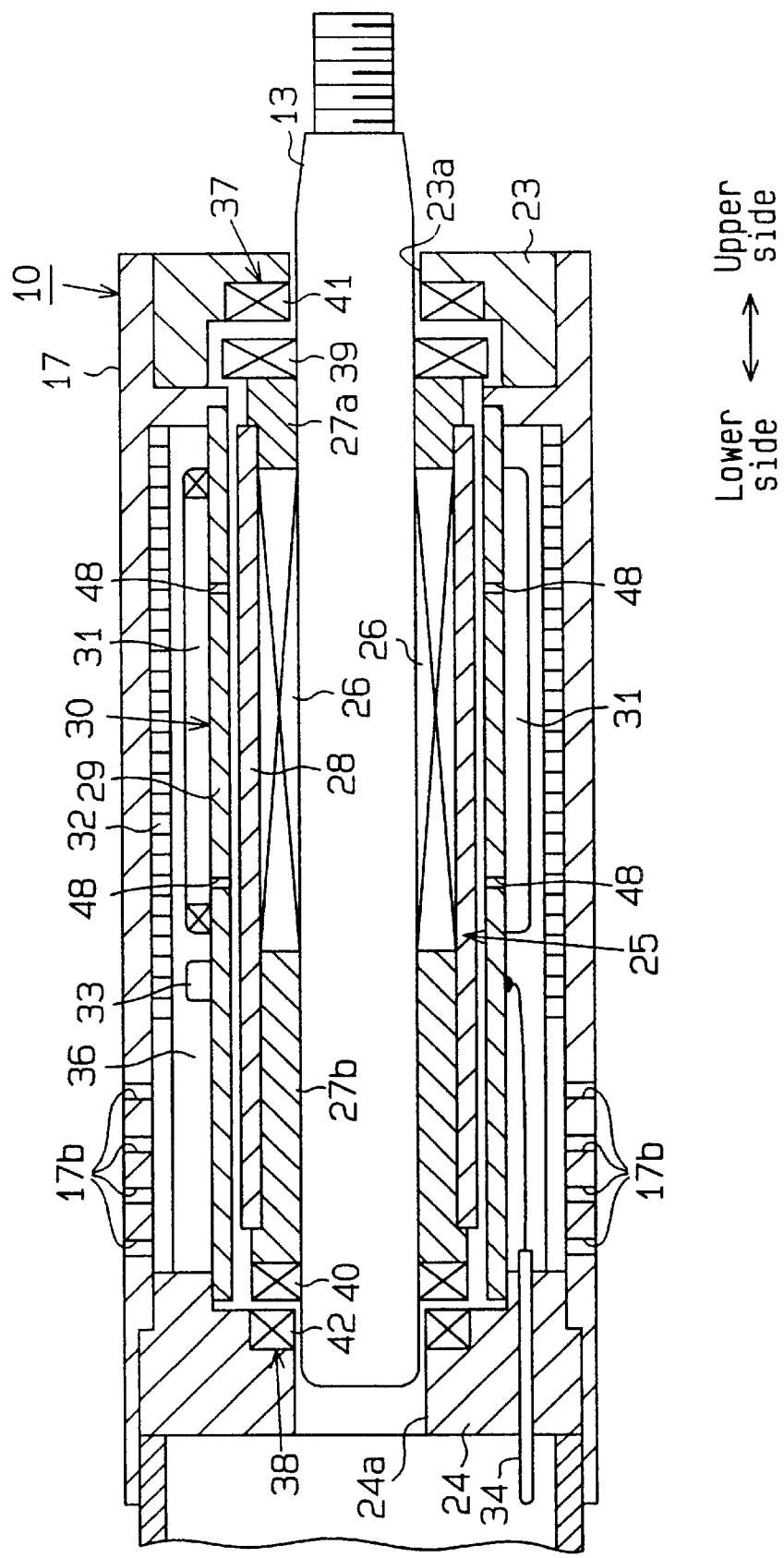
FIG. 2 is a cross-sectional view showing a brushless motor of the turbo-molecular pump of FIG. 1.

As shown in FIG. 2, a pair of annular plugs 23, 24 are fitted into the ends of the motor case 17. An upper bore 23a extends through the center of the upper plug 23, and a lower bore 24a extends through the center of the lower plug 24. The bores 23a, 24a receive the rotary shaft 13.

A rotary element 25, which is fixed to the shaft 13, rotates integrally with the shaft 13. The rotary element 25 includes a field magnet 26, a pair of bushings 27a, 27b, a rotary tube, or cylinder 28, and a pair of rotary magnets 39, 40. The field magnet 26 has four permanent magnet plates (not shown). The four permanent magnet plates are parallel to one another and extend axially about the shaft 13. Further, the four permanent magnet plates are arranged to form a cylindrical shape. The polarity of each magnet plate differs from that of the adjacent magnet plates in an alternating manner. The rotary cylinder 28, or rotary member, covers the field magnet 26. The two bushings 27a, 27b seal the space between the rotary cylinder 28 and the shaft 13 and hold the field magnet 26 in between. The bushings 27a, 27b function to adjust the rotating balance of the rotary element 25.

A cylindrical fixed tube, or surface 29 is secured to the motor case 17 to cover the rotary element 25. The fixed surface 29 and the shaft 13 are coaxial. The inner surface of the fixed surface 29 is ground to improve its friction characteristics. The rotary cylinder 28 and the fixed surface 29 form an air bearing 30 that radially supports the rotary shaft 13.

Three equally spaced armature coils 31 are arranged about the peripheral surface of the fixed surface 29. The angular dimension of each armature coil 31 is within a range of 90° to 120°. A cylindrical yoke 32 is secured to the inner surface of the motor case 17 to surround the armature coils 31.

Three magnetic sensors (Hall devices) 33 are arranged along the outer surface of the fixed surface 29 in correspondence with the three armature coils 31. The three armature coils 31 and the three magnetic sensors 33 are each connected to a plurality of connector pins 34 (only one shown in FIG. 2), which extend through the plug 24. The connector pins 34 are electrically connected to an external control circuit (not shown). The magnetic sensors 33 detect changes in the polarity of the field magnet 26. The control circuit detects the rotating speed based on the detection signal of the magnetic sensors 33 and controls the current provided to the armature coils 31 accordingly to control the rotating speed of the shaft 13.

A pair of magnetic bearings 37, 38 support the rotary shaft 13 in a non-contacting manner. The upper magnetic bearing 37 includes the upper rotary magnet 39 and an upper fixed magnet 41, which is fixed to the upper plug 23. The lower magnetic bearing 38 includes,the lower rotary magnet 40 and a lower fixed magnet 42, which is fixed to the lower plug 24. The facing surfaces of the magnets 39, 41 have the same polarity. Thus, the magnets 39, 41 repel one another. Further, the facing surfaces of the magnets 40, 42 have the same polarity and the magnets 40, 42 repel one another. The magnets 39–42 are all made of the same material, preferably from a neodymium magnet or a samarium magnet.

The rotary cylinder 28 and the fixed surface 29 are coaxial. A clearance having a predetermined radial distance C is provided between the rotary cylinder 28 and the fixed surface 29. The clearance distance C is predetermined in accordance with the capability of the motor 10 (e.g., the motor rotating speed). If the rotating speed of the motor 10 is in a range of 60,000 rpm to 90,000 rpm, the clearance distance C is 10 $\mu$m or lower. If the rotating speed of the motor 10 is in a range of 50,000 rpm to 70,000 rpm, the clearance distance C is 3 $\mu$m to 6 $\mu$m. In the first embodiment, the clearance distance C is set to 5 $\mu$m.

The rotary cylinder 28 and the fixed surface 29 are made of sintered ceramic. More specifically, the rotary cylinder 28 is made of silicon carbide, and the fixed surface 29 is made of alumina. The coefficient of thermal expansion of silicon carbide is 3 to $4 \times 10^{-6}/°$ C. The coefficient of thermal expansion of, alumina is 7 to $8 \times 10^{-6}/°$ C. In other words, the coefficient of thermal expansion of the material used for the fixed surface 29 is greater than that of the material used for the rotary cylinder 28.

Figure 3:
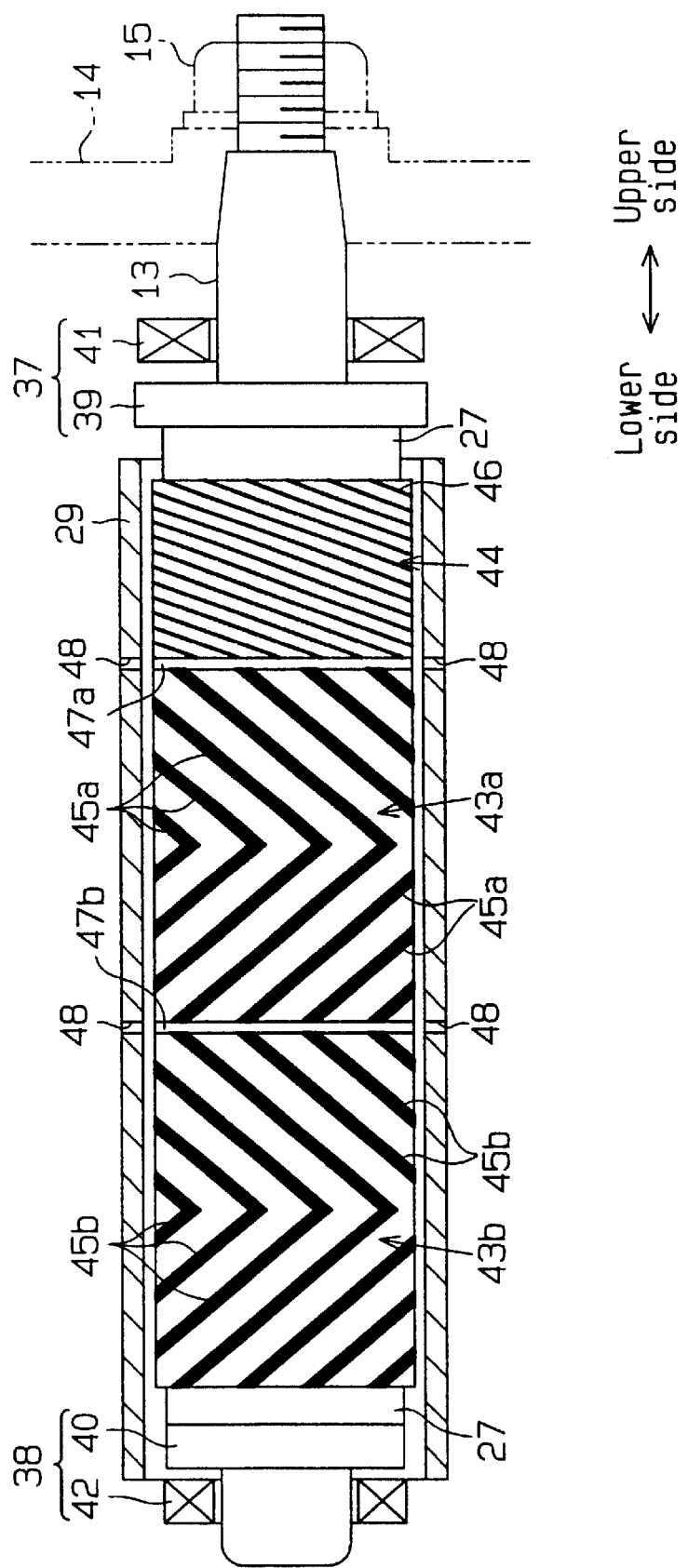
FIG. 3 is a side view, partly in cross-section, showing an air bearing of the brushless motor of FIG. 2.

As shown in FIG. 3, an upper air bearing area 43a, a lower air bearing area 43b, and a gas seal area 44 are defined on the outer surface of the rotary cylinder 28. The gas seal area 44 is located closer to the upper end of the rotary cylinder 28 than the upper air bearing area 43a. A plurality of equally spaced V-shaped grooves (dynamic pressure grooves) 45a, 45b, which are arranged in a herringbone pattern, extend circumferentially along the upper and lower air bearing areas 43a, 43b, respectively. A helical groove (seal groove) 46 extends along the gas seal area 44. An annular groove 47a extends between the upper air bearing area 43a and the gas seal area 44, and an annular groove 47b extends between the upper and lower air bearing areas 43a, 43b.

Referring to FIGS. 2 and 3, a plurality of apertures 48 extend through the fixed surface 29 at locations corresponding to the annular grooves 47a, 48a. When the motor 10 is driven, the V-shaped grooves 45a, 45b function to draw the air outside the fixed surface 29 through the apertures 48 and toward the outer surface of the rotary cylinder 28. As the rotating speed of the rotary element 25 increases, the amount of air drawn into the clearance between the rotary cylinder 28 and the fixed surface 29 increases thereby forming compressed gas layers. The compressed gas layers prevent the rotary element 25 from contacting the fixed surface 29 during rotation.

As the motor 10 drives the rotary shaft 13 and rotates the wheel 14, the air in the intake 3a is drawn into the space between the rotor vanes 16 and the stator vanes 7. The air is drawn into the outer helical groove 17a of the motor case 17 and into the space between the rotary shaft 13 and the motor case 17. Then, the air flows through the inner helical groove 46 and the apertures 48 into a gap 36 formed between the fixed surface 29 and the motor case 17. The air is then released into the discharge region 19 through the slits 17b. The released air is discharged through vent holes 4a formed in the lower housing 4. As the air passes through the outer helical groove 17a and the inner helical groove 46, the velocity of the air increases significantly. The velocity change increases the fluid drawing effect. The outer helical groove 17a and the inner helical groove 46 extend in a direction corresponding to the rotation direction. Thus, the flow of air in the grooves 17a, 46 is restricted to one direction. This prevents reversed air flow in the grooves 17a, 46 and increases the depressurization capability of the pump 1.

When the motor 10 is driven, the V-shaped grooves 45a, 45b function to form a high-pressure compressed gas layer at the axially middle portion of each air bearing area 43a, 43b. The compressed gas layer causes the rotary element 25 to float away from the inner surface of the fixed surface 29 when the rotating speed approaches 5000 rpm. In this state, the rotary shaft 13 (the rotary element 25) is radially supported by the air bearing 30.

When a certain amount of time elapses after the motor 10 reaches a normal rotating speed, the viscous friction of air heats the rotary cylinder 28 and the fixed surface 29. In this state, the air current produced by the fan unit 20 passes through the slits 17b and toward the fixed surface 29, which cools the fixed surface 29 with forced air. Hence, the temperature increase of the fixed surface 29 is relatively small. The rotary cylinder 28 is not cooled with forced air. Hence, the temperature increase of the rotary cylinder 28 is relatively large. Accordingly, when the pump 1 is operated, the temperature difference between the rotary cylinder 28 and the fixed surface 29 reaches approximately 80° C. to 100° C.

However, the coefficient of thermal expansion of the rotary cylinder 28 is smaller than that of the fixed surface 29. Accordingly, the change in the outer diameter of the rotary cylinder 28 is about the same or slightly greater than that of the inner diameter of the fixed surface 29. Thus, the temperature-related change in the distance C between the fixed surface 29 and the rotary cylinder 28 is small.

Figure 4:
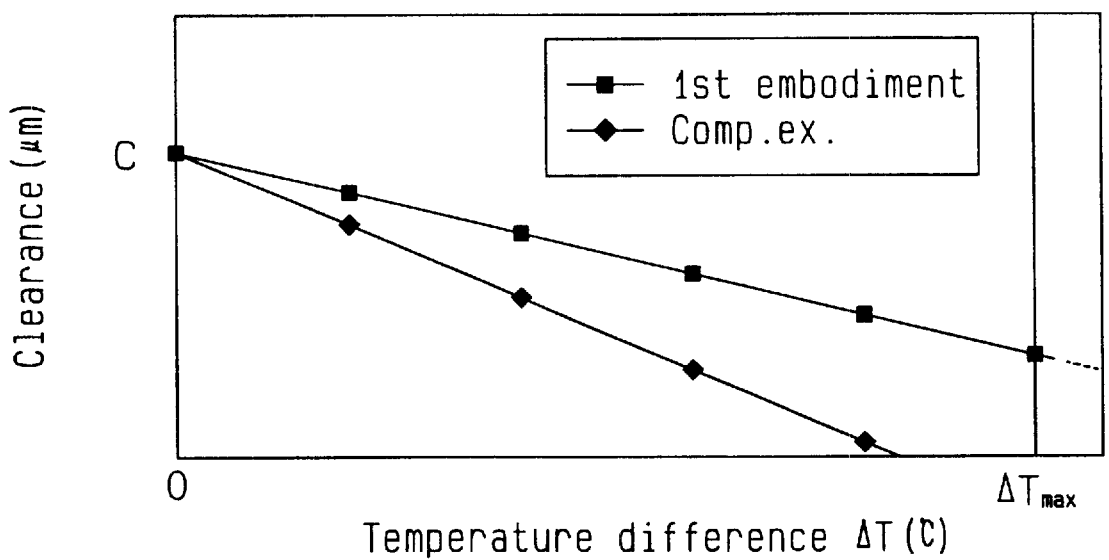
FIG. 4 is a graph showing the relationship between the size of the air bearing clearance and the temperature difference between a rotary cylinder and a fixed surface.

FIG. 4 is a graph showing the relationship between the clearance distance C ($\mu$m) and the temperature difference $\Delta$T (° C.) between the rotary cylinder 28 and the fixed surface 29. In the graph, the black squares represent points in the relationship when the rotary cylinder 28 is made of silicon carbide and the fixed surface 29 is made of alumina, as in the first embodiment. The black diamonds represent points in the relationship when the rotary cylinder 28 and the fixed surface 29 are both made of alumina. The relationship indicated by the black diamonds is referred to as a comparative example. The maximum temperature difference between the rotary cylinder 28 and the fixed surface 29 in the operation range is represented by $\Delta$Tmax. The initial clearance distance C is, for example, 3 to 6 $\mu$m. If the rotary shaft 13 is rotated at 50,000 to 70,000 rpm, $\Delta$Tmax is about 80 to 120° C.

It is apparent from the graph of FIG. 4 that the decrease in the clearance distance C, which is caused by changes in the temperature, is smaller when the coefficient of thermal expansion of the material of the rotary cylinder 28 is smaller than that of the fixed surface 29.

The coefficient of thermal expansion of the rotary cylinder and the fixed surface in the comparative example is 7 to 8×10$^{-6}$/° C. The coefficient of thermal expansion of the rotary cylinder is thus relatively large, and the difference between the coefficient of thermal expansion of the rotary cylinder and that of the fixed surface is null. Therefore, in the comparative example, the clearance is eliminated before the temperature difference $\Delta$T reaches the maximum temperature difference $\Delta$Tmax.

In comparison, in the first embodiment, the coefficient of thermal expansion of the material of the rotary cylinder 28 is 3 to 4×10$^{-6}$/° C., whereas the coefficient of thermal expansion of the material of the fixed surface 29 is 7 to 8×10$^{-6}$/° C. The coefficient of thermal expansion of the rotary cylinder 28 is relatively small, and the difference between the two coefficients of thermal expansion is about 4×10$^{-6}$/° C. Thus, the reduction of the clearance distance C caused by changes in the temperature is smaller than that of the comparative example. As a result, the clearance is not eliminated when the temperature difference $\Delta$T reaches the maximum temperature difference $\Delta$Tmax. Accordingly, contact between the rotary cylinder 28 and the fixed surface 29 is prevented regardless of continuous high speeds, and a further increase in the rotating speed is possible even if the initial value of the clearance distance C is 3–6 $\mu$m.

The desired effect is achieved as long as a ceramic having a low coefficient of thermal expansion of 5×10$^{-6}$/° C. or less is used as the material of the rotary cylinder. The desired effect is guaranteed to take place when the coefficient of thermal expansion is 4×10$^{-6}$/° C. or less. As long as the difference in the coefficients of thermal expansion between the rotary cylinder 28 and the fixed surface 29 is 1×10$^{-6}$/° C. or more, the desired effect is obtained. The desired effect is guaranteed to take place when the difference between the coefficients of thermal expansion is 2×10$^{-6}$/° C. or more.

For example, since the coefficient of thermal expansion of zirconia is 7 to 8×10$^{-6}$/° C. and close to that of alumina, zirconia may be used as the material of the fixed surface 29.

The coefficient of thermal expansion of silicon nitride is 3 to 4×10$^{-6}$/° C. and close to that of silicon carbide. Thus, silicon nitride may be used as the material of the rotary cylinder 28.

By using silicon carbide or silicon nitride as the material of the rotary cylinder 28, heat dissipation of the rotary cylinder 28 is improved since the coefficient of thermal conductivity of the rotary cylinder 28 is relatively high.

The first embodiment has the advantages described below.

The rotary cylinder 28 is formed from a ceramic material having a coefficient of thermal expansion that is smaller than that of the fixed surface 29. Thus, the clearance may be set at a relatively small value of several micrometers. Accordingly, the motor 10 and the turbo-molecular pump 1 can be made smaller and can be operated at higher speeds.

Since the clearance is small, the turbo-molecular pump 1 achieves a higher degree of vacuum at high rotating speeds.

An oxide ceramic such as alumina or zirconia is used as the material of the fixed surface 29. Thus, the machining and manufacturing of the air bearing 30 is relatively simple, which reduces cost.

The rotary cylinder 28 is made of silicon carbide or silicon nitride. Thus, the coefficient of thermal expansion of the rotary cylinder 28 is small and heat is easily dissipated. This reduces the temperature of the rotary cylinder 28 and limits the reduction of the clearance distance C. Accordingly, the motor 10 can be operated at higher rotating speeds.

The O-rings 11, 12, which are made of rubber, elastically connect the motor 10 to the housing 2. This absorbs the vibrations of the motor 10 that would otherwise be transmitted to the housing 2.

A turbo-molecular pump according to the present invention will now be described. In the second embodiment, the material of the rotary cylinder 28 differs from that of the fixed surface 29. The rotary cylinder 28 is made of silicon carbide, and the fixed surface 29 is made of silicon nitride. The coefficient of thermal expansion of the rotary cylinder 28 is 3 to 4×10$^{-6}$/° C., which is about the same as that of the fixed surface 29.

Figure 5:
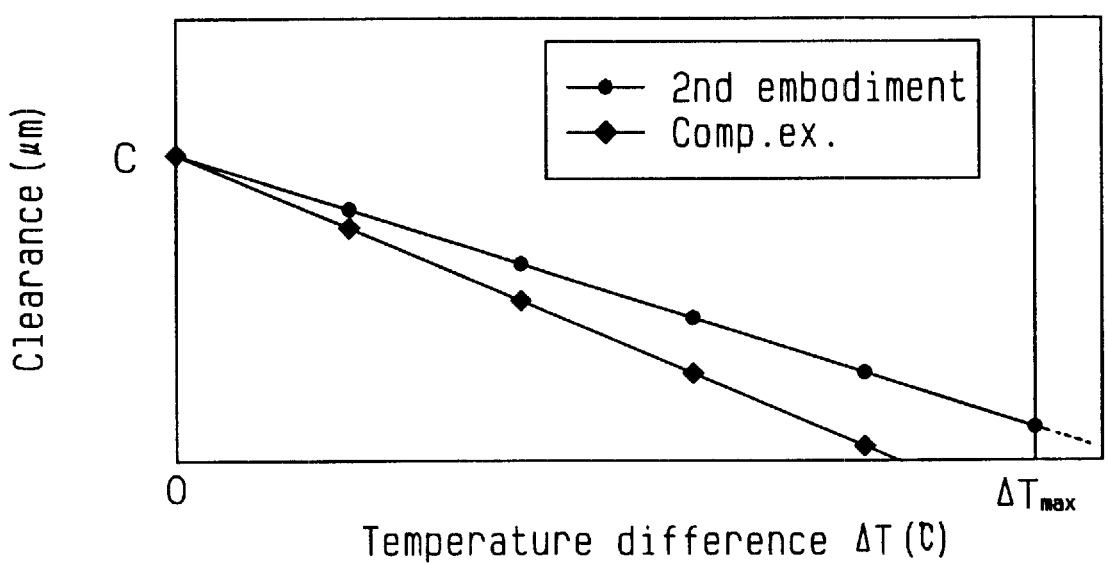
FIG. 5 is a graph showing the relationship between the size of an air bearing clearance and the temperature difference between a rotary cylinder and a fixed surface in a turbo-molecular pump according to a second embodiment of the present invention.

FIG. 5 is a graph showing the relationship between the clearance distance C ($\mu$m) and the temperature difference $\Delta$T (° C.) between the rotary cylinder 28 and the fixed surface 29. The black circles represent points in the relationship when the rotary cylinder 28 is made of silicon carbide and the fixed surface 29 is made of silicon nitride. In other words, the circles represent the second embodiment. As shown in FIG. 5, the reduction in the clearance distance C that is caused by changes in the temperature is smaller than that of the comparative example. In the second embodiment, the difference between the coefficients of thermal expansion of the materials used for the rotary cylinder 28 and the fixed surface 29 is substantially null. However, the coefficient of thermal expansion of the rotary cylinder 28 is 3 to $4 \times 10^{-6}/°$C. and relatively small. Thus, the clearance is not eliminated when the temperature difference $\Delta T$ reaches the maximum temperature difference $\Delta T_{max}$. Accordingly, contact between the rotary cylinder 28 and the fixed surface 29 is prevented at continuous high speeds and a further increase in the rotating speed is possible.

In the second embodiment, the material combination of the rotary cylinder 28 and the fixed surface 29 may be changed to silicon carbide and silicon carbide, silicon nitride and silicon nitride, or silicon nitride and silicon carbide, respectively. These material combinations also achieve the necessary clearance and permit high speed rotation without contact between the rotary cylinder 28 and the fixed surface 29.

When the coefficients of thermal, expansion of the rotary cylinder 28 and the fixed surface 29 are substantially the same, the desired effect is achieved if the material of the rotary cylinder 28 has a coefficient of thermal expansion of $5 \times 10^{-6}/°$C. or lower. The desired effect is further guaranteed if the material has a coefficient of thermal expansion of $4 \times 10^{-6}/°$C. or lower.

The materials used for the rotary cylinder 28 and the fixed surface 29 are carbides or nitrides, which have coefficients of thermal conductivity that are higher than those of oxides. The rotary cylinder 28 and the fixed surface 29 thus have improved heat dissipation and avoid contact.

A turbo-molecular pump according to a third embodiment of the present invention will now be described with reference to FIGS. 6A to 8.

Figure 7:
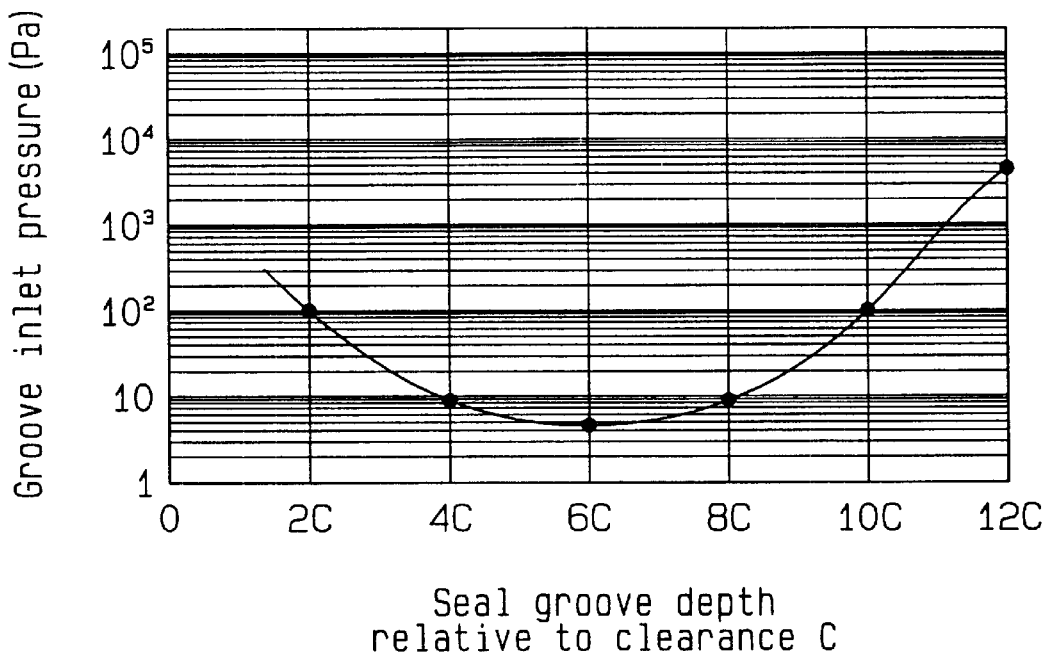
FIG. 7 is a graph showing the relationship between the seal groove depth and the groove inlet pressure.

As shown in FIG. 6B, like the first embodiment, there are V-shaped grooves 45a, 45b, a helical groove 46, and annular grooves 47a, 47b in the rotary cylinder 28. The depth of each type of groove differs from that of the other types. FIG. 7 is a graph showing the relationship between the depth of the helical groove 46 and the pressure at the inlet of the groove (Pa). The groove inlet pressure is the pressure that acts on the upper end (right side as viewed in FIG. 6A) of the helical groove 46. It is preferred that the value of the groove inlet pressure be as small as possible. More specifically, it is preferred that the groove inlet pressure be $10^2$Pa or lower. The lower end of the helical groove 46 is exposed to the compressed air layer. Thus, it is required that the helical groove 46 (gas seal area 44) function as an air seal under a pressure difference of $10^2$Pa or more.

As apparent from FIG. 7, the seal effect of the gas seal area 44 depends on the depth of the helical groove 46. The desired seal is obtained when the depth of the helical groove 46 is two to ten times the clearance distance C. To obtain a high sealing effect, the preferred depth of the helical groove 46 is four to eight times the clearance distance C.

The relationship between the depth of the V-shaped grooves 45a, 45b and the natural frequency of the rotary element 25 will now be described. The motor 10 is used within a range of about 60,000 to 90,000 rpm. Accordingly, the rotating speed, or frequency, of the rotary element 25 during operation is 1,000 to 1,500 rps (Hz). To avoid resonance, the value of the natural frequency of the rotary element 25 (in Hz) must differ greatly from the operation speed (in RPS).

Figure 8:
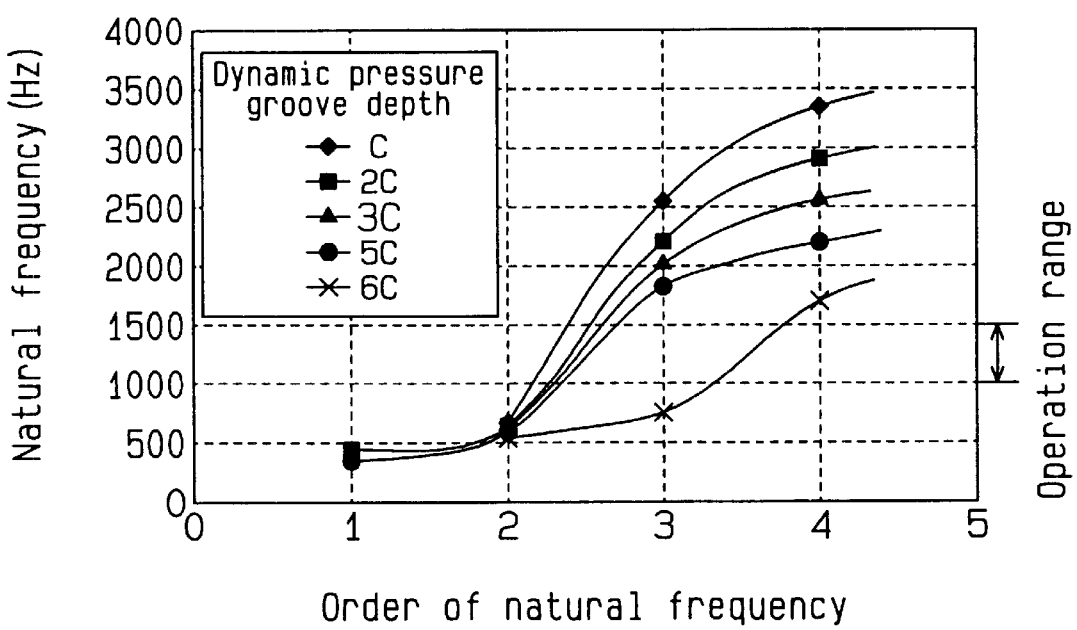
FIG. 8 is a graph showing the relationship between the dynamic pressure groove depth and the natural frequency of the rotary cylinder.

As apparent from FIG. 8, the natural frequency of the rotary element 25 decreases as the depth of the V-shaped grooves 45a, 45b increases. When the depth of the V-shaped grooves 45a, 45b is one to five times the clearance distance C, the natural frequency is not included in the operation speed range. If the depth of the V-shaped grooves 45a, 45b is 6C, the natural frequency of the rotary element 25 approaches the operation speed range (about 1000 to 1500 Hz). In such state, resonance is apt to occur and smooth rotation of the rotary shaft 13 may be hindered. Accordingly, the preferred depth of the V-shaped grooves 45a, 45b is one to five times the clearance distance C.

To smoothly draw air through the apertures 48 and into the clearance, the depth of the annular grooves 47a, 47b must not exceed a value that is two times the depth of the V-shaped grooves 45.

The depth of the annular grooves 47a, 47b is required to exceed two times the depth of the V-shaped grooves 45a, 45b. Thus, to facilitate manufacture, it is preferred that the clearance distance C be three to fifteen times the depth of the V-shaped grooves 45a, 45b. The manufacture of the rotary cylinder 28 is especially facilitated when the depth of the annular grooves 47a, 47b is equal to the sum of the depth of the V-shaped grooves 45a, 45b and the depth of the helical groove 46.

When the depth of the V-shaped grooves 45a, 45b is represented by $A_{ps}$, the depth of the annular grooves 47a, 47b by $A_R$, and the depth of the helical groove 46 by $A_{GS}$, the range of each value is $A_{ps}=1 \times C$ to $5 \times C$, $A_{GS}=2 \times C$ to $10 \times C$, and $A_R=3 \times C$ to $15 \times C$. It is especially effective if $A_{GS}$ equals $4 \times C$ to $8 \times C$. It is preferred that the depth combination satisfy the relationship of $A_R=A_{ps}+A_{GS}$. The preferred clearance distance C is about ten micrometers or less.

The third embodiment has the advantages described below.

When the motor 10 is driven, the V-shaped grooves 45a, 45b function to form a high-pressure compressed gas layer with the air drawn in through the apertures 48 at the axially middle portion of each air bearing area 43a, 43b. The depth of the annular grooves 47 is set at $A_R=3C$ to 15C. During rotation, air flows smoothly from the apertures 48 to the clearance. Thus, the compressed gas layer is readily formed. When the rotating speed approaches 5,000 rpm, the compressed gas layers cause the rotary element 25 to float away from the inner surface of the fixed surface 29. That is, the rotary element 25 is supported by the air bearing 30.

The depth of the V-shaped grooves 45a, 45b is set at $A_{ps}=1C$ to 5C. Thus, the natural frequency of the rotary element 25 differs greatly from the operation speed range and prevents the rotary element 25 from resonating. Accordingly, satisfactory bearing characteristics are obtained. Further, the rotary shaft 13 is stable in the operation speed range.

The depth of the helical grooves 46 is set at $A_{GS}=2C$ to 10C. Thus, a high vacuum degree of $10^2$Pa or lower is guaranteed. If the condition of $A_{GS}=4C$ to 8C is satisfied, a vacuum degree of 10Pa or lower is obtained.

The outer helical groove 17a increases the degree of vacuum (about 1Pa or less). In addition, the relative rotation between the rotor vanes 16 and the stator vanes 7 functions to further decrease the pressure of the intake region thereby achieving an ultra-high vacuum. In other words, the degree of vacuum generated by the turbo-molecular pump 1 is determined not only by the depressurization capability of the rotor vanes 16 and the stator vanes 7 but also by the seal characteristics of the outer helical groove 17a and the gas seal area 44. In the third embodiment, the seal characteristics of the helical groove 46 and the outer helical groove 17a are improved. Thus, the turbo-molecular pump 1 produces a greater vacuum.

The depth of the annular grooves 47a, 47b is set equal to the sum of the depth of the V-shaped grooves 45a, 45b and the depth of the helical groove 46 ($A_R=A_{ps}+A_{GS}$). Thus, three types of grooves 45a–47b having different depths may be formed through two groove forming processes.

It should be apparent to those skilled in the art that the present invention may be embodied in many other specific forms without departing from the spirit or scope of the invention. Particularly, it should be understood that the present invention may be embodied in the following forms.

In the first embodiment, any kind of material may be used as long as the coefficient of thermal expansion of the material of the rotary cylinder 28 is smaller than that of the material of the fixed surface 29. For example, the rotary cylinder 28 may be made of alumina and the fixed surface 29 may be made of zirconia. Further, boron nitride or aluminum nitride may be used as the material of the rotary cylinder 28 or the fixed surface 29.

In the first embodiment, the ceramic material of the rotary cylinder 28 and the ceramic material of the fixed surface 29 is not limited to materials in which the difference in the coefficients of thermal expansion is equal to or greater than a predetermined value. As long as the coefficient of thermal expansion of the material of the rotary cylinder 28 is $5\times10^{-6}/°$ C. or lower, a material combination having a small difference in the coefficients of thermal expansion also maintains the clearance of the air bearing 30 in the operation speed range.

In the third embodiment, due to the anti-wear characteristics and heat characteristics, ceramic is preferred as the material for the rotary cylinder 28 and the fixed surface 29. However, at least one of the rotary cylinder 28 and the fixed surface 29 may be made of plastic as long as the material has the necessary anti-wear and heat characteristics. Further, the material of the rotary cylinder 28 and the material of the fixed surface 29 may either be the same or different.

In the first and second embodiments, a ceramic oxide, such as mullite or zircon, which resist wear, may be used as the material of the fixed surface 29.

In the first and second embodiments, cordierite, which is an oxide having a low coefficient of thermal expansion, may be used as the material of the rotary cylinder 28.

In the first and second embodiments, a static air bearing may be employed as the air bearing 30.

In the first and second embodiments, an air bearing may be employed in lieu of the magnetic bearings 37, 38, which support the rotary shaft.

In the first and second embodiments, the outer helical groove 17a may be eliminated.

In the third embodiment, the depth of the annular grooves 47a, 47b is not limited to the sum of the depth of the V-shaped grooves 45a, 45b and the depth of the helical groove 46. As long as the annular grooves 47a, 47b have a depth that is two times the depth of the V-shaped grooves 45a, 45b, a sufficient amount of air is provided to the clearance and a high-pressure compressed gas layer is formed.

In the third embodiment, the depth of the annular grooves 47a, 47b may be changed as required. However, if the depths of the V-shaped grooves 45a, 45b and the helical groove 46 is set in the same manner as the third embodiment, the seal and bearing characteristics are improved.

In the first to third embodiments, at least one of the dynamic pressure grooves 45a, 45b and, the helical groove 46 may be formed on the inner surface of the fixed surface 29.

In the first to third embodiments, the motor 10 may be applied to an apparatus other than the turbo-molecular pump 1, for example, a compressor.

In the first to third embodiments, the helical grooves 17a, 46 extend in a direction corresponding to the rotating direction of the motor 10. However, if, for example, the motor 10 is employed in a compressor, the helical grooves 17a, 46 may extend in the opposite direction.

The present examples and embodiments are to be considered as illustrative and not restrictive, and the invention is not to be limited to the details given herein, but may be modified within the scope and equivalence of the appended claims.

What is claimed is:

1. A motor provided in a turbo-molecular pump, comprising:
    a rotary shaft including a magnet; and
    a bearing for radially supporting the rotary shaft, wherein the bearing includes:
        a cylindrical rotary member connected To The rotary shaft over the magnet;
        a cylindrical fixed surface surrounding the rotary member, wherein the fixed surface is spaced from the rotary member by a predetermined distance, and wherein the materials of the rotary member and the fixed surface are selected so that the material of the rotary member has a coefficient of thermal expansion that is smaller than that of the material of the fixed surface; and
        armature coils arranged about a peripheral surface of the fixed surface to rotate the rotary shaft.

2. The motor according to claim 1, wherein the difference between the coefficient of thermal expansion of the material of the fixed surface and the coefficient of thermal expansion of the material of the rotary member is $1\times10^{-6}/°$ C. or more.

3. The motor according to claim 1, wherein the material of the rotary member has a coefficient of thermal expansion that is $5\times10^{-6}/°$ C. or less.

4. The motor according to claim 3, wherein the fixed surface is made of a ceramic oxide material.

5. The motor according to claim 4, wherein the fixed surface is made of alumina or zirconia.

6. The motor according to claim 3, wherein the rotary member is made of a ceramic carbide material or a ceramic nitride material.

7. The motor according to claim 6, wherein the rotary member is made of silicon carbide or silicon nitride.

8. The motor according to claim 1, further comprising a case for accommodating the bearing, the rotary member, and the fixed surface, wherein the case has an outer surface with one or more slits disposed thereon for cooling the bearing and the fixed surface.

9. A motor provided in a turbo-molecular pump, comprising:
    a rotary shaft including a magnet;
    a bearing for radially supporting the rotary shaft, wherein the bearing includes:
        a cylindrical rotary member connected to the rotary shaft over the magnet; and
        a cylindrical fixed surface surrounding the rotary member, wherein the fixed surface is spaced from the rotary member by a predetermined distance, and wherein the rotary member is made of a material having a coefficient of thermal expansion that is $5\times10^{-6}/°$ C. or less; and armature coils arranged about a peripheral surface of the fixed surface to rotate the rotary shaft.

10. The motor according to claim 9, wherein the rotary member is made of a ceramic carbide material or a ceramic nitride material.

11. The motor according to claim 10, wherein the rotary member is made of silicon carbide or silicon nitride.

12. The motor according to claim 9, further comprising a case for accommodating the bearing, the rotary member, and the fixed surface, wherein the case has an outer surface with one or more slits disposed thereon for cooling the bearing and the fixed surface.

13. A turbo-molecular pump comprising:

a housing;

a stator vane attached to the housing;

a rotor vane rotated relative to the stator vane; and a motor for driving the rotor vane, wherein the motor includes:
  a motor shaft including a magnet; and
  a bearing for radially supporting the rotary shaft, wherein the bearing includes:
    a cylindrical rotary member connected to the rotary shaft over the magnet;
    a cylindrical fixed surface surrounding the rotary member, wherein the fixed surface is spaced from the rotary member by a predetermined distance, and wherein the material of the rotary member has a coefficient of thermal expansion that is smaller than that of the material of the fixed surface; and
    armature coils arranged about a peripheral surface of the fixed surface to rotate the rotary shaft.

14. The pump according to claim 13, further comprising a device for cooling the motor.

15. A turbo-molecular pump comprising:

a housing;

a stator vane attached to the housing;

a rotor vane rotated relative to the stator vane; and a motor for driving the rotor vane, wherein the motor includes:
  a rotary shaft including a magnet; and
  a bearing for radially supporting the rotary shaft, wherein the bearing includes:
    a cylindrical rotary member connected to the rotary shaft over the magnet;
    a cylindrical fixed surface surrounding the rotary member, wherein the fixed surface is spaced from the rotary member by a predetermined distance, and wherein the rotary member is made of a material having a coefficient of thermal expansion that is $5\times10^{-6}/°$ C. or less, and which is smaller than the coefficient of thermal expansion of the material of the fixed surface; and
    armature coils arranged about a peripheral surface of the fixed surface to rotate the rotary shaft.

16. The pump according to claim 15, further comprising a device for cooling the motor.

17. A method for producing a brushless motor of a turbo-molecular pump having a rotary shaft including a magnet and an air bearing, wherein the air bearing includes a cylindrical rotary member connected to the rotary shaft over the magnet, and a cylindrical fixed surface covering the rotary shaft, the method comprising the step of:

selecting materials for the rotary member and the fixed surface so that the material of the rotary member has a coefficient of thermal expansion that is smaller than that of the material of the fixed surface; and assembling the rotary member and the fixed surface so that the fixed surface surrounds the rotary member and the fixed surface is spaced from the rotary member by a predetermined distance.

18. A motor provided in a compressor comprising:

a rotary shaft including a magnet; and a bearing for radially supporting the rotary shaft, wherein the bearing includes:
  a cylindrical rotary member connected to the rotary shaft over the magnet;
  a cylindrical fixed surface surrounding the rotary member, wherein the fixed surface is space from the rotary member by a predetermined distance, and wherein the materials of the rotary member and the fixed surface are selected so that the material of the rotary member has a coefficient of thermal expansion that is smaller than that of the materials of the fixed surface; and
  armature coils arranged about a peripheral surface of the fixed surface to rotate the rotary shaft.

19. A motor provided in a compressor, comprising:

a rotary shaft including a magnet;

a bearing for radially supporting the rotary shaft wherein the bearing includes:
  a cylindrical rotary member connected to the rotary shaft over the magnet; and
  a cylindrical fixed surface surrounding the rotary member, wherein the fixed surface is spaced from the rotary member by a predetermined distance, and wherein the rotary member is made of a material having a coefficient of thermal expansion that is $5\times10^{-6}/°$ C. or less; and
  armature coils arranged about a peripheral surface of the fixed surface to rotate the rotary shaft.

20. A method for producing a brushless motor of a compressor having a rotary shaft and an air bearing, wherein the air bearing includes a cylindrical rotary member connected to the rotary shaft, and a cylindrical fixed surface covering the rotary shaft, the method comprising the step of:

selecting materials for the rotary member and the fixed surface so that the material of the rotary member has a coefficient of thermal expansion that is smaller than that of the material of the fixed surface; and assembling the rotary member and the fixed surface so that the fixed surface surrounds the rotary member and the fixed surface is spaced from the rotary member by a predetermined distance.

* * * * *

UNITED STATES PATENT AND TRADEMARK OFFICE
CERTIFICATE OF CORRECTION

PATENT NO.    : 6,664,683 B1
DATED         : December 16, 2003
INVENTOR(S)   : Hirokazu Yashiro et al.

It is certified that error appears in the above-identified patent and that said Letters Patent is hereby corrected as shown below:

<u>Column 13,</u>
Line 23, delete "motor", and insert therefor -- rotary --.

<u>Column 14,</u>
Line 23, delete "space", and insert therefor -- spaced --.
Line 34, after "shaft" and before "wherein", insert -- , --.

Signed and Sealed this

Second Day of March, 2004

JON W. DUDAS
*Acting Director of the United States Patent and Trademark Office*